(12) United States Patent  
Diehl et al.

(10) Patent No.: US 8,213,613 B2
(45) Date of Patent: Jul. 3, 2012

(54) DEVICE PAIRING

(75) Inventors: Eric Diehl, Liffre (FR); Jean-Pierre Andreaux, Amsterdam (NL); Louis-Xavier Carbonnel, Pace (FR); Alain Durand, Rennes (FR)

(73) Assignee: Thomson Licensing, Boulogne-Billancourt (FR)

( * ) Notice: Subject to any disclaimer, the term of this patent is extended or adjusted under 35 U.S.C. 154(b) by 1036 days.

(21) Appl. No.: 11/198,584

(22) Filed: Aug. 5, 2005

(65) Prior Publication Data

US 2006/0033840 A1 Feb. 16, 2006

(30) Foreign Application Priority Data

Aug. 11, 2004 (EP) ..................................... 04300532

(51) Int. Cl.
*H04N 7/167* (2011.01)
(52) U.S. Cl. ......................................................... 380/211
(58) Field of Classification Search .................. 380/270, 380/211
See application file for complete search history.

(56) References Cited

U.S. PATENT DOCUMENTS

| 6,286,103 | B1 * | 9/2001 | Maillard et al. | 726/26 |
| 6,385,317 | B1 | 5/2002 | Rix et al. | |
| 6,405,369 | B1 | 6/2002 | Tsuria | |
| 6,762,690 | B1 | 7/2004 | Diehl et al. | |
| 6,904,522 | B1 * | 6/2005 | Benardeau et al. | 713/156 |
| 7,024,482 | B2 * | 4/2006 | Hlasny | 709/227 |
| 7,191,335 | B1 * | 3/2007 | Maillard | 713/176 |
| 7,370,201 | B2 * | 5/2008 | Arnoux | 713/171 |
| 7,409,550 | B2 * | 8/2008 | Avramopoulos et al. | 713/171 |
| 7,475,148 | B2 * | 1/2009 | Hlasny | 709/227 |
| 2002/0059642 | A1 * | 5/2002 | Russ et al. | 725/135 |
| 2002/0120928 | A1 * | 8/2002 | Wajs | 725/25 |

(Continued)

FOREIGN PATENT DOCUMENTS

EP 1 439 697 A1 7/2004

(Continued)

OTHER PUBLICATIONS

Search Report.

*Primary Examiner* — Kambiz Zand
*Assistant Examiner* — Teshome Hailu
(74) *Attorney, Agent, or Firm* — Tutunjian & Bitetto, P.C.

(57) ABSTRACT

The invention relates to pairing a slave device with a master device, for example decoders in a conditional access system. There is provided a security module that stores a device state that indicates whether a decoder shall be a master or a slave decoder. There is also provided a method in a conditional access system of providing a device with a device state stored on a security module. It is detected that the security module is in connection with the device and the device state is transferred from the security module to the device. There is further provided a method of pairing a slave device with a master device. The slave device asks the master device to identify itself, the master device returns an identification, and if the slave device has not yet been paired with a master device, it checks the identity of the master device and, if the identity is verified pairs with the master device. There is also provided a first, slave, device for pairing with a second, master, device. The first device comprises an interface for sending an identification command to and receiving an identification message from the master device, and a processor for checking the identity of the second device and pairing the first device with the second device.

2 Claims, 5 Drawing Sheets

U.S. PATENT DOCUMENTS

| | | | |
|---|---|---|---|
| 2003/0097563 A1* | 5/2003 | Moroney et al. | 713/170 |
| 2004/0257470 A1* | 12/2004 | Leyendecker et al. | 348/552 |
| 2005/0060540 A1* | 3/2005 | Okaue et al. | 713/160 |
| 2005/0071866 A1* | 3/2005 | Louzir et al. | 725/31 |
| 2005/0144248 A1* | 6/2005 | Doganowski et al. | 709/208 |
| 2006/0153386 A1* | 7/2006 | Ksontini et al. | 380/277 |
| 2007/0094691 A1* | 4/2007 | Gazdzinski | 725/62 |
| 2007/0098165 A1* | 5/2007 | Yoshikawa | 380/211 |

FOREIGN PATENT DOCUMENTS

| | | |
|---|---|---|
| JP | 2000004431 | 1/2000 |
| JP | 2000059408 | 2/2000 |
| JP | 2000341227 | 12/2000 |
| JP | 2001298722 | 10/2001 |
| JP | 2004147344 | 5/2004 |
| WO | WO 03/105437 A1 | 12/2003 |
| WO | WO 2004/019296 A1 | 3/2004 |

* cited by examiner

DEVICE PAIRING

This application claims the benefit, under 35 U.S.C. §119 of European Patent Application 04300532.1, filed Aug. 11, 2004.

FIELD OF THE INVENTION

The present invention relates generally to pairing of devices, and in particular to pairing of devices in systems in which terminals are given conditional access to content. The present invention is advantageously applied to pairing of decoders in Pay TV systems.

BACKGROUND OF THE INVENTION

The term "decoder," which will be used as an exemplary implementation of a terminal, as used herein may refer to a decoder physically separate from a receiver, a combined receiver and decoder, such as in a set-top box (decoder), or a decoder having additional functions, for example recording devices, displays or web browsers. It will also be assumed that the general concepts of conditional access systems are well known and that they, as such, will not need to be described further hereinafter where this is not needed for the comprehension of the invention.

Conditional access systems, such as Pay TV that will be used throughout the description, has gained wide acceptance in many countries. Many households have a decoder, and a majority of households have more than one TV set. Currently, with one decoder, a subscriber can often access Pay TV programmes on only one TV set. Two main solutions have been proposed to solve this problem.

A first solution is to distribute the received content within the household. The current state of the art is to use wireless analogue retransmission. Unfortunately, the video quality is bad and it is only possible to watch one and the same program on all the connected TV sets.

A second solution is to simply provide more decoders in the household. Many broadcasters offer a second, cheaper subscription to households that already have a subscription. However, as broadcasters fear that neighbours or relatives will "share" the two subscriptions to get an average lower price for their subscriptions, they request that the two decoders should be paired. FIG. 1 illustrates the basic, prior art concept. Two decoders 11, 12 are linked through a bi-directional digital connection 13. One decoder 11 acts as the master and the other decoder 12 acts as the slave. The master 11 is always able to access programs authorized by the subscription, while the slave 12 is able to access programs authorized by the subscription only if it is connected to the master 11.

Several methods exist to verify that the two decoders are used together.

One solution, proposed by some conditional access (CA) providers is to use dedicated Entitlement Management Messages (EMMs). The master decoder 11 receives, apart from the EMMs directed to it, also the EMMs intended for the slave decoder 12, and sends the latter EMMs to the slave 12 over the digital connection 13. While other, more complex solutions exist, it will be appreciated that even this relatively simple solution implicates big modifications of the CA system and a strong linking with the broadcaster's back office, and that it is, for these reasons, impractical, if not unusable, in a horizontal market.

WO 2004/019296, "Secure Electric Anti-Theft Device, Anti-Theft System Comprising One Such Device and Method of Matching Electric Devices", describes a method that ensures pairing between several networked devices. To fully operate, a device requires the presence of the security device it was imprinted to during an initialisation phase. Although this method could be used to pair decoders, it would mean that a master decoder and a slave decoder are differentiated, which is a problem for the manufacturer, the retailer, and the after-sales staff.

WO 03/105437, "Method, System and Terminal for Receiving Content with Authorized Access", describes another method that ensures pairing between several networked devices. A secondary device (i.e. a slave device) is able to access content only if it is paired with, and can communicate with, a predetermined principal terminal (i.e. a master) with which it has been paired initially. This method as well is limited in some situations in that there is a certain lack of flexibility, since for example a slave decoder must be paired with a particular master for it to work. As before, this is a problem for the manufacturer, the retailer, and the after-sales staff.

It can therefore be appreciated that there is a need for a flexible solution that makes it possible to turn, in a controlled and reliable fashion, a decoder into a master decoder or a slave decoder. The transformation should preferably occur in the subscriber's home (or equivalent location). Furthermore, the solution should also ensure the pairing between a master decoder and a slave decoder. This invention provides such a solution.

SUMMARY OF THE INVENTION

In a first aspect, the invention is directed to a security module for use with a device to be paired with another device. The security module has a processor and a memory that stores a changeable device state that indicates whether the decoder shall be a master or a slave decoder.

The security module is thus able to provide the device state and, as the device state can change, the usage flexibility is improved.

In a preferred embodiment, the device state is changed upon reception and processing of a dedicated Entitlement Management Message (EMM).

The device state can thus be changed over the broadcast network, which means that the device state may be changed remotely.

In an alternate preferred embodiment, the device state of a new security module changes after a predetermined time in use unless the security module receives a dedicated Entitlement Management Message (EMM) before then.

The device state can thus be changed automatically, while the change can be inhibited over the broadcast network, which means that the device state may be changed automatically or remotely.

In a second aspect, the invention is directed to a method in a conditional access system of providing a device with a device state that is stored on a security module and informs the device whether it should act as a master device or a slave device. The security module's connection with the device is detected and the device state is transferred from the security module to the device.

The method provides an easy way of providing a device with a device state.

In a preferred embodiment, to transfer the device state, the device sends identification data and a random number to the security module. The security module computes a derived key, using the identification data and a stored master key, and a hash from the derived key, the random number, and the device state, and sends the device state and the hash to the device. The device verifies the device state using the hash, the derived key, and the random number.

The device state is thus securely transferred from the security module to the device.

In a preferred embodiment, the device also stores the device state.

In a third aspect, the invention is directed to a method of pairing a slave device with a master device. The slave device sends a command asking the master device to identify itself and the master device returns a message identifying itself. If the slave device has not yet been paired with a master device, it checks the identity of the master device, using the received message. If the identity is verified the slave device pairs with the master device.

A successful execution of the method thus leaves the slave device paired with a master device.

In another preferred embodiment, the slave device, paired with a master device, verifies that the identity of the second device equals a previously stored identity of a second device; and, if the verification is successful, pairing the slave device with the master device.

In a further preferred embodiment, security is further enhanced, if desired by running at least one challenge-response protocol, requiring every protocol to succeed before pairing the devices.

In a fourth aspect, the invention is directed to a first device for pairing with a second device. The first device acts as a slave device and the second device as a master device. The first device comprises an interface for sending a command asking the second device to identify itself, and for receiving from the second device a message identifying the second device. The first device also comprises a processor for checking, if the first device has not yet been paired with a master device, the identity of the second device, and for pairing the first device with the second device, if the identity is verified.

There is thus provided a device for pairing with another device, using a method according to the invention.

BRIEF DESCRIPTION OF THE DRAWINGS

Preferred features of the present invention will now be described, purely by way of example, with reference to the accompanying drawings, in which.

PREFERRED EMBODIMENT OF THE INVENTION

Figure 1:
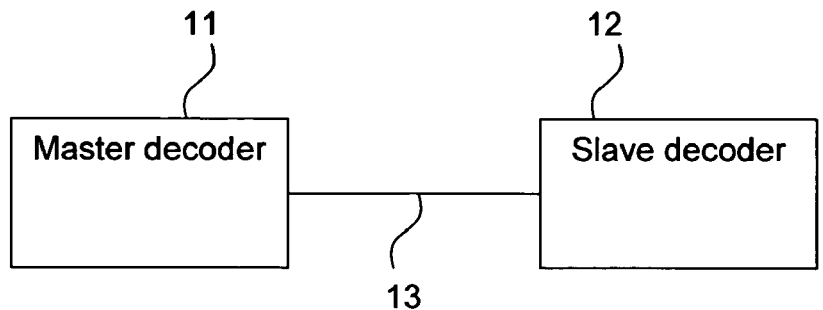
FIG. 1 illustrates the basic concept of pairing of decoders according to the prior art.
Figure 2:
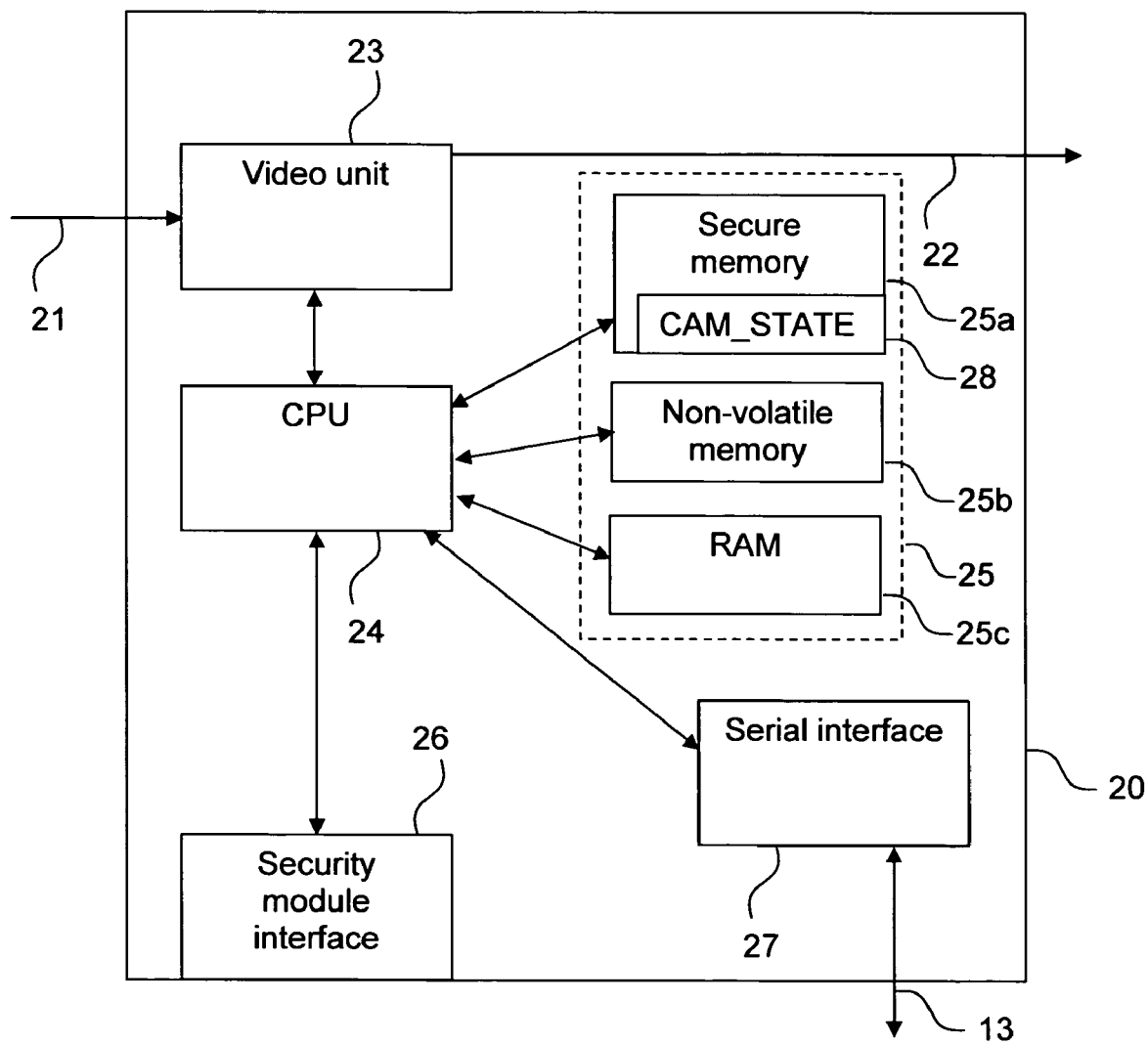
FIG. 2 illustrates the architecture of a decoder according to the invention.

FIG. 2 is a simplified illustration of the architecture of a preferred embodiment of a decoder 20 according to the invention. The decoder 20 comprises a Central Processing Unit (CPU) 24, a video unit 23, a security module interface 26 advantageously in the form of a ISO-7816 compliant smart card interface, a serial interface 27, and memory 25, advantageously in the form of a secure, non-volatile memory 25a, a non-volatile memory 25b, and a Random Access Memory (RAM) 25c. The video unit 23 receives the video stream through an incoming connection 21, extracts Entitlement Control Messages (ECMs) and Entitlement Management Messages (EMMs), and passes them to the CPU 24 to be forwarded via the security module interface 26 to the security module (not shown in this figure). The video unit 23, if authorised by the security module, also descrambles the video stream and outputs it on connection 22, normally connected to a display (not shown). The security module interface 26 realises the physical and electrical interface with the security module. The RS 232 serial interface 27 allows among other things connection with another decoder over the digital connection 13, previously discussed with reference to FIG. 1, which may for example take the form of a wire connection or a Bluetooth® connection.

Figure 3:
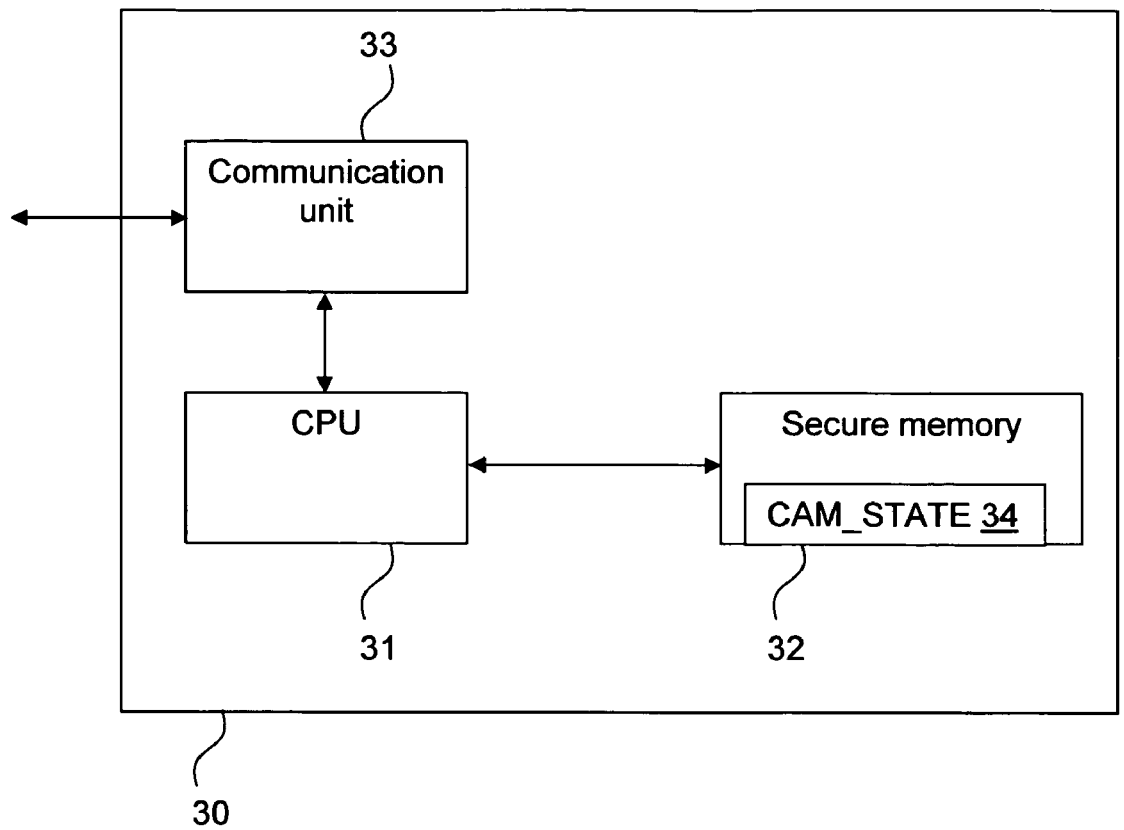
FIG. 3 illustrates an exemplary security module.

FIG. 3 is a simplified illustration of an exemplary security module 30 according to the invention, such as the security modules 43, 44 in FIG. 4 hereinafter. The security module 30 comprises a Central Processing Unit (CPU) 31, a memory 32, and a communication unit 33. It is the ISO-7816 compliant communication unit 33 that communicates with the security module interface (26 in FIG. 2) of the host decoder (20 in FIG. 2). It is assumed that the memory 32 and the RAM (not shown) of the CPU 31 are secure, i.e. difficult or even impossible to access by an attacker. The security module 30 may for example be a smart card or a PC card, both well known in the art.

In order to perform the method of pairing according to the invention as described hereinafter, in a preferred embodiment, the security module and the decoder store certain data and are able to perform certain functions as will now be described.

The memory 32 of the security module 30 stores, preferably simultaneously, the following information:
  a master symmetric key MK; and
  a state CAM_STATE 34 that can take two logical values: "Master" or "Slave"; and
  temporary variables for calculations and verifications.

The CPU 31 of the security module 30 is arranged to perform:
  a key derivation algorithm KeyDevAlgo, which for example is an Advanced Encryption Standard (AES) algorithm that derives a key from, for instance the master key MK and an identification value [see FIPS Publication 197: "Advanced Encryption Standard"; National Institute of Standards and Technology, 2001.]; and
  a Message Authentication Code (MAC) generation algorithm MACGenerate, such as for example HMAC-SHA1 [see FIPS Publication 198: "The Keyed-Hash Message Authentication Code (HMAC)"; National Institute of Standards and Technology, 2001.], for calculating a hash value.

The decoder 20 stores, not necessarily simultaneously, preferably in the memory indicated by its reference number (secure non-volatile memory 25a, non-volatile memory 25b, and RAM 25c) within parenthesis:
  an identification data ID (25b);
  a derived symmetric key (DK) that satisfies the equality DK=KeyDevAlgo{MK}(ID) (25c);
  a state decoder_STATE that can take two logical values: "Master" or "Slave" (25a);
  a very large number S, unique for each decoder (25a);
  a public number n, equal for every decoder of a model, a manufacturer, or a system, where n is the product of two very large, secret, prime numbers (25b);

a number V such that $S=\sqrt[V]{V}$ mod n (25b);

the signature, SigV, of V, signed by the broadcaster (25b);

the public key of the broadcaster, $K_{pub\_sig}$, used for checking the signature (25a);

a state PAIRING_STATE 28 that can take three logical values: "virgin", "paired", or "blocked" (25a);

a random number R (25c);

temporary variables for calculations and verifications (25c); and a number V', which will be further described hereinafter (25c).

The CPU 24 of the decoder 20 is able to perform:

a Message Authentication Code (MAC) verification algorithm MACVerify; and generation of a random number, which in practice is a Pseudo Random Number (PRNG).

Figure 4:
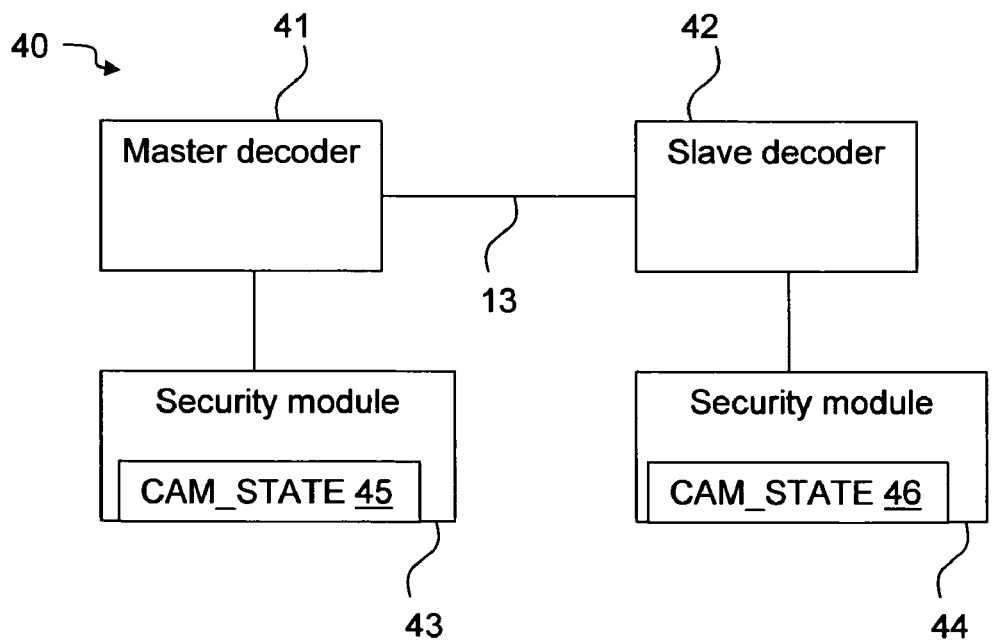
FIG. 4 illustrates paired decoders according to the invention.

FIG. 4 illustrates paired decoders according to a preferred embodiment of the invention. In a conditional access system 40, the decoders 41, 42 are equipped with removable security modules 43, 44 (also called CA modules), either in the form of smart cards or PCMCIA (Personal Computer Memory Card International Association) form factor-modules (also called PC Cards). The security modules 43, 44, among other things, process Entitlement Management Messages (EMMs) and Entitlement Control Messages (ECMs), and the information therein is used by the decoder to decrypt scrambled transmissions.

Newly manufactured decoders of the same model according to the invention are identical in most aspects and in particular in that while they are neither master nor slave, they have the possibility to become either (or even both, as will be seen hereinafter, although not at the same time, at least not within a single decoder pair).

When a decoder 41, 42 is installed for the first time, the decoder asks its security module 43, 44 whether it should behave as a master or a slave and the security module 43, 44 returns the CAM_STATE 45, 46 it has stored. If the security module 43, 44 answers master, then the decoder 41, 42 will act as a master decoder 41. Conversely, if the security module 43, 44 answers slave, then the decoder 41, 42 will act as a slave decoder 42. A master decoder 41 descrambles (also called decrypts) content if its security module 43 returns the proper descrambling (also called decryption) keys, which it does, in the absence of error, for the services (comprising programmes) corresponding to the subscription. A slave decoder 42 descrambles content using descrambling keys provided by its security module 44 only if the two decoders 41, 42 are connected via the digital connection 13 and properly paired.

Figure 5:
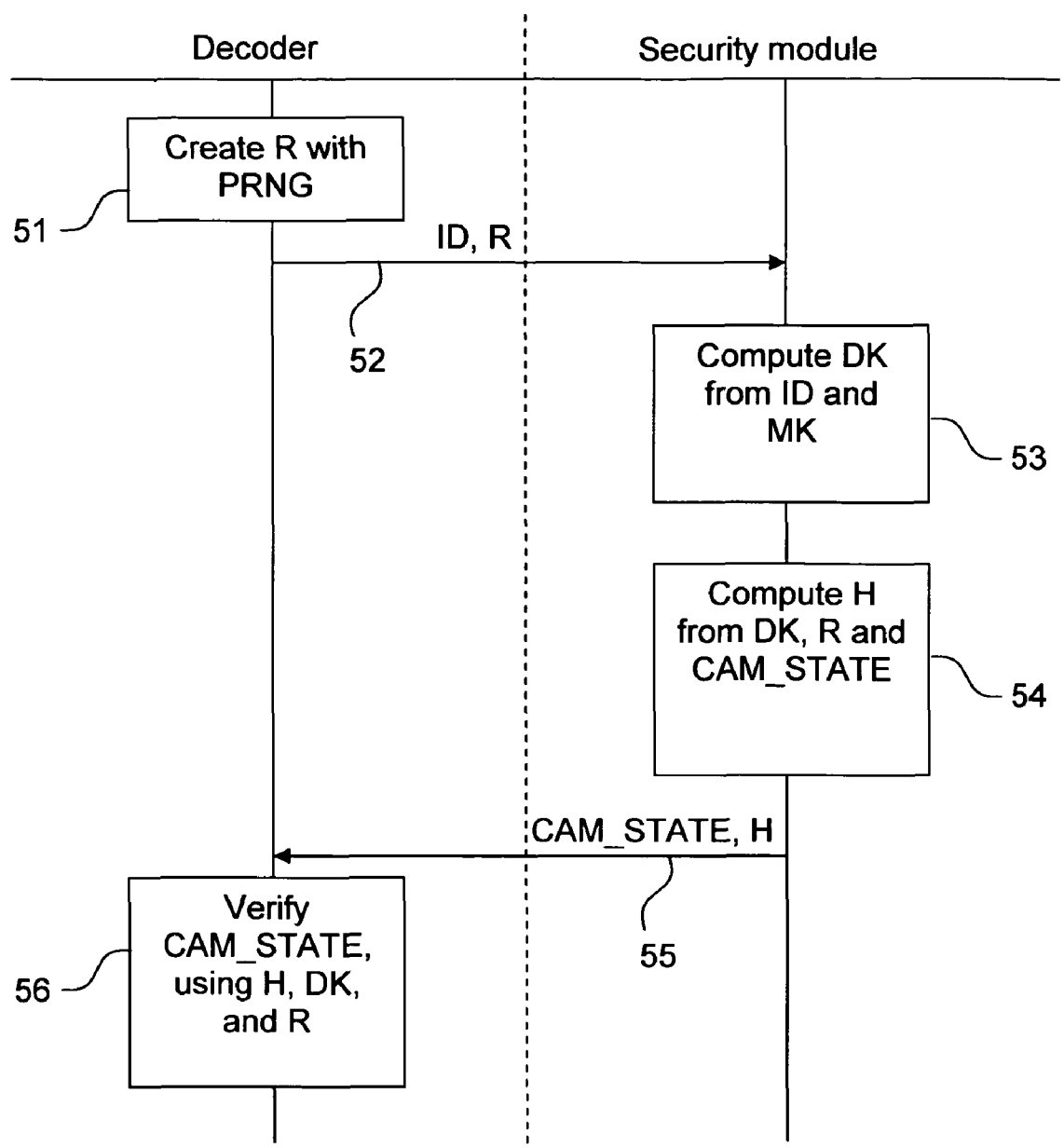
FIG. 5 illustrates a method of state verification involving a decoder and the associated security module according to the invention.

In addition to asking, at installation, its security module about behaviour, a decoder also asks the same thing every time it detects that a security module has been inserted into it (or otherwise put into connection with it), and may also do so at random times or intervals, preferably using the following method, illustrated in FIG. 5. It should however be noted that it is also possible for the security module send behaviour information to the decoder directly.

According to the invention, two methods may be used when the decoder asks its security module about behaviour. The simplest method is a request through a simple command. This method has, however, the drawback that the answer may be easily reproduced, for instance by hackers. A preferred, more secure method is to establish a secure channel based on session keys between the decoder and the security module. As for the information necessary for the secure channel, all the decoders may share the same global secret, although this makes the system vulnerable to reverse engineering. It is preferred that each decoder has its own secret, which vastly reduces this vulnerability.

In step 51, the decoder uses its PRNG to pick a random (in practice pseudo-random) value R. The decoder sends this random value R along with its ID to the security module as message 52 over the secure channel. The security module computes DK from the received ID and MK using KeyDevAlgo in step 53, and the hash H from its state CAM_STATE, the derived key DK and the random R using MACGenerate in step 54. The security module then sends its state CAM_STATE and the hash H to the decoder as message 55. Finally, in step 56, the decoder uses MACVerify to verify the CAM_STATE using the data H, R, and DK. If CAM_STATE is verified then decoder_STATE takes as value CAM_STATE, otherwise decoder_STATE remains unchanged. In this way, a decoder may change between master and slave, as needed. However, if a decoder does not receive an answer from the security module or if it detects that it is no longer connected to the security module, then it is preferable if a master decoder automatically changes to "slave", preferably immediately, but it also possible to do it after a number of unsuccessful attempts to contact the security module, or after a certain time.

A security module may have received the information for the answer in different ways.

One solution is for the CA provider to deliver two types of security modules: master cards and slave cards, where master cards always return the answer "master" and slave cards always return the answer "slave".

Figure 6:
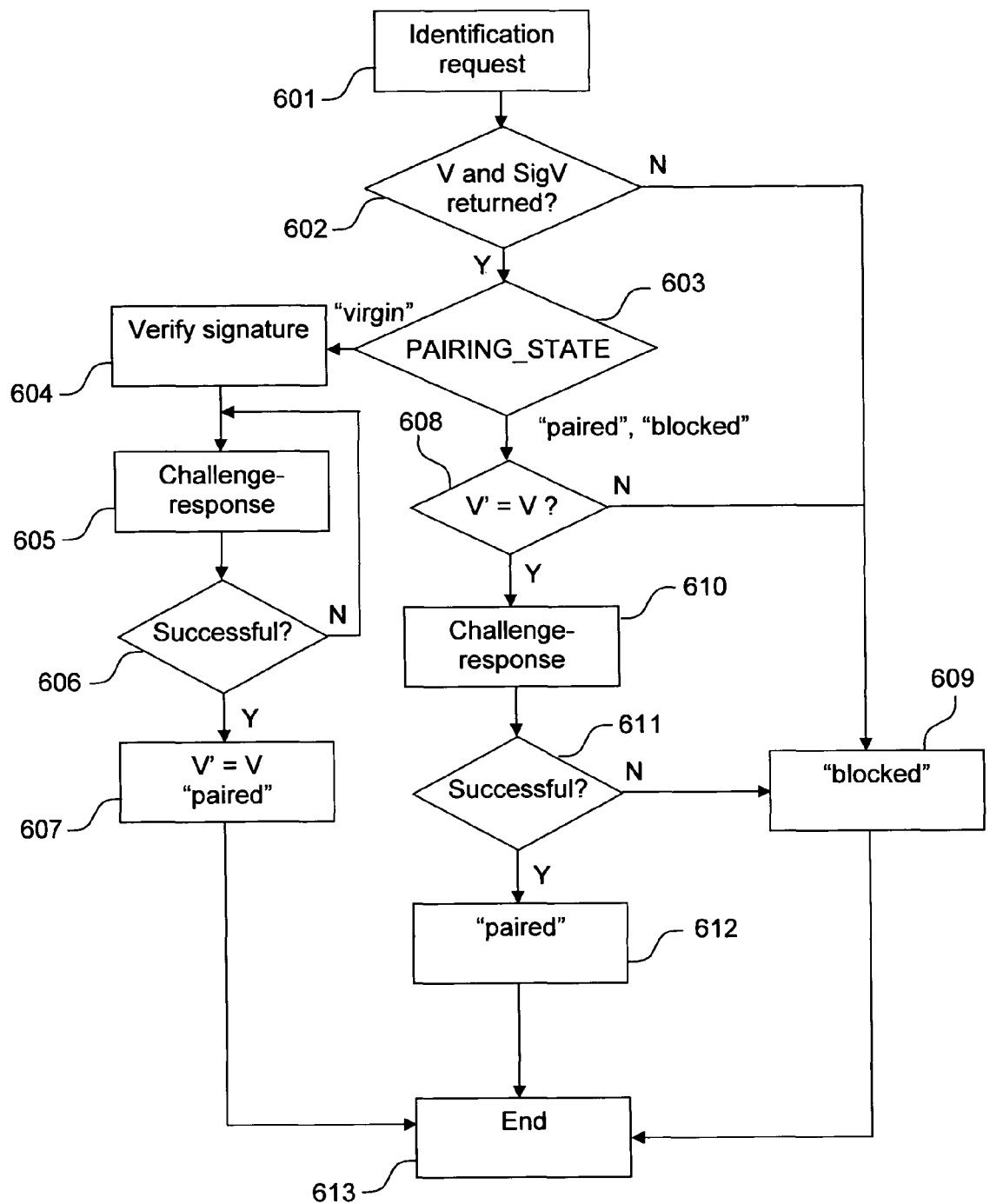
FIG. 6 illustrates a method of pairing between two decoders according to the invention.
Figure 7:
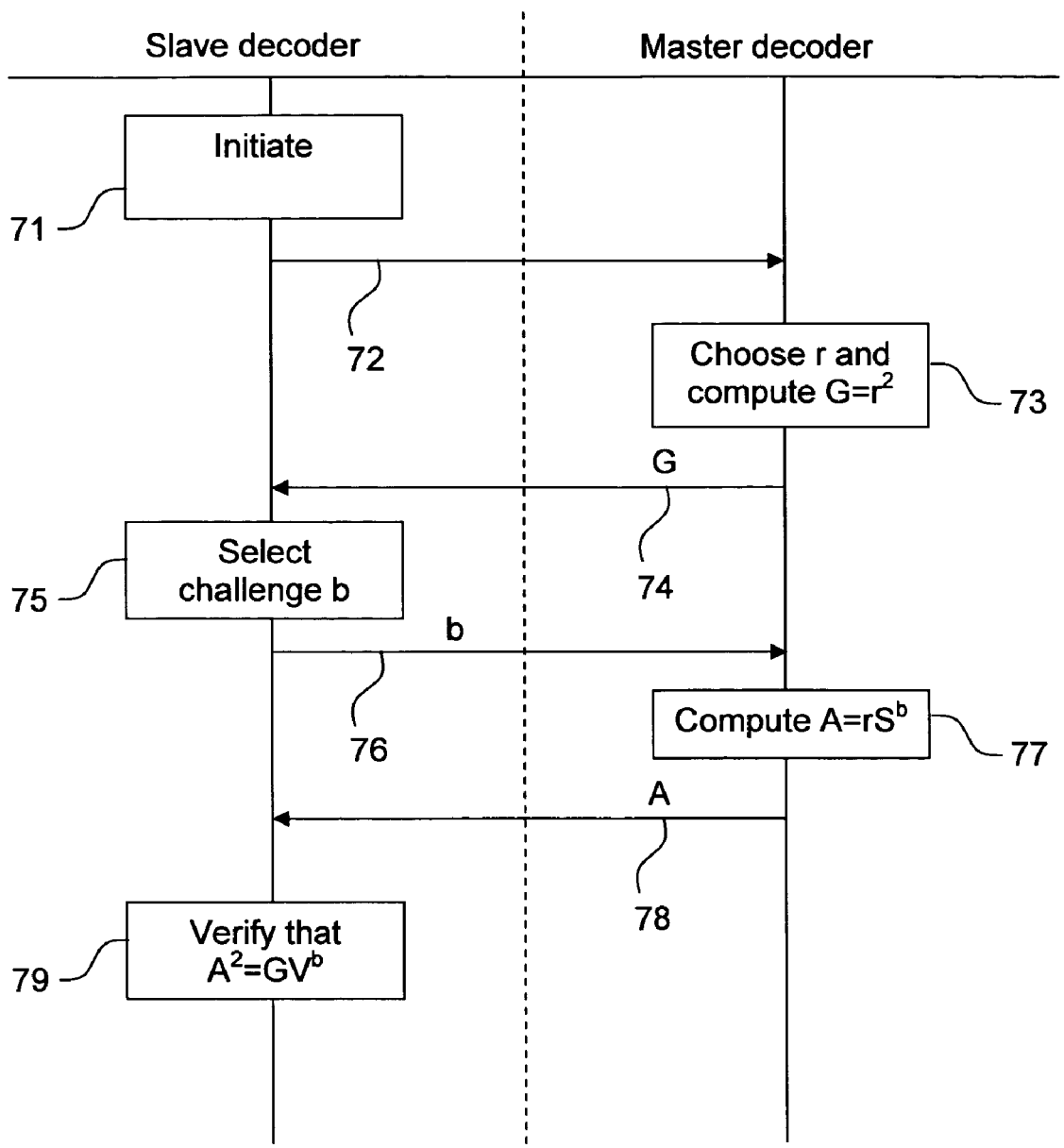
FIG. 7 illustrates an exemplary challenge-response protocol according to the prior art.

Another, preferred, solution is for the CA provider to deliver one unique type of security module that by default returns one type of answer, i.e. either "master" or "slave". Then, by transmitting a dedicated EMM, the broadcaster can change this answer. More complex schemes are possible, such as for example having the security module begin by answering "master", and, after a predetermined time in use, for example a fortnight, changing this answer to "slave" unless it before then receives an EMM telling it to remain with "master". In an elaboration of the latter scheme, it is FIG. 6 illustrates a method of verifying that a slave decoder is in the presence of the master decoder it has been paired with. The method can be performed whenever a decoder becomes a slave decoder and/or at random times. The slave decoder 42 sends a command over the link 13, asking the other decoder to identify itself, step 601. If the decoder is present and its decoder_STATE is Master, then it returns V and SigV, otherwise it returns nothing. In step 602, it is verified if there is a response or not. If nothing is returned, the PAIRING_STATE of the slave decoder is set to "blocked" after which the method ends, but if a response is given, then the PAIRING_STATE of the slave is checked, step 603, and there are three possibilities:

The PAIRING_STATE of the slave decoder is "virgin" (i.e. it has never been paired):

The CPU of the slave decoder checks V using signature SigV using the public key $K_{pub\_sig}$. If the signature is successfully verified in step 604, the slave decoder then in step 605 begins L successive challenge-response protocols with the master decoder, advantageously of the zero-knowledge type (such as Fiat-Shamir) well known in the art (of which an exemplary embodiment is illustrated in FIG. 7), where typical values for L are between 10 and 20, inclusive. If all the challenge-response protocols succeed, then in step 607 the CPU stores V as V', changes its PAIRING_STATE to "paired" and the decoder becomes a fully operational slave decoder, after which the method ends in step 613. However, as soon as a challenge-response protocol fails, then the decoder does not change its PAIRING_STATE, and remains unable to descramble content. The decoder then, either immediately or after a predetermined or random time, restarts the method illustrated in FIG. 6 and asks the decoder to restart the sequence of challenge-response protocols.

The PAIRING_STATE of the slave decoder is "paired" (i.e. it has been paired successfully) or "blocked" (i.e. at least part of the decoder functionality is inhibited):

Its CPU verifies in step 608 that received V is equal to stored V'. If it is not the case (which is the case if, for instance, the user attempted to link the decoder to a decoder other than the decoder it is paired with), then the PAIRING_STATE is set to "blocked" in step 609, and the decoder becomes (or, depending on the case, remains) unable to descramble content. However, if V and V' match, then the CPU starts the sequence of challenge-response protocols in step 610, and, if all protocols succeed, then the PAIRING_STATE of the slave decoder becomes "paired" and it becomes a fully operational slave decoder, step 612, after which the method ends in step 613. If, on the other hand, a protocol fails, then the PAIRING_STATE of the slave decoder becomes (or remains) "blocked" and the decoder becomes (or remains) unable to descramble content, step 609, after which the method ends in step 613.

A master decoder may always descramble content, but a slave decoder may only do so if it is duly paired; if it for example is not connected to a master decoder, then descrambling is not possible. It should also be noted that a decoder only answers challenges and other messages and requests sent from a slave decoder if its decoder_STATE is "master"; a slave decoder does not answer.

FIG. 7 illustrates an exemplary challenge-response protocol between two decoders (41 and 42 in FIG. 4) according to the prior art. In the description, the terms master decoder and slave decoder are used as an example, as this is the normal state of affairs. The slave decoder initiates the protocol, step 71, and sends a message 72 over connection 13 asking the master decoder for a commitment. In step 73, the master decoder chooses a nonce r and computes commitment $G=r^2$ that it sends to the slave in message 74. The slave decoder selects a random challenge b using PNRG, step 75, and sends it to the master in message 76. The master then calculates a response $A=rS^b$, step 77, that is returned to the slave as message 78. In step 79, the slave verifies the response by checking that $A^2$ indeed equals $GV^b$. If the verification succeeds, then the challenge-response protocol is successful; otherwise it is unsuccessful.

It can thus be appreciated that the invention as described herein offers a method of enforcing pairing of two decoders with the following advantages:

At manufacture there is no differentiation of decoders. A decoder may become either a master decoder, or a slave decoder and the differentiation occurs only after installation of the decoder.

The invention requires at most slight changes of the Conditional Access system. If the CA provider differentiates the cards at personalization, then the method can be performed with already existing messages.

The state of a decoder may be updated over-the-air through the transmission of dedicated EMMs.

The back office does not need to trace and list the coupling of entitlements and decoders, which simplifies after sale maintenance.

It will be understood that the present invention has been described purely by way of example, and modifications of detail can be made without departing from the scope of the invention. In particular, the invention can be applied to pairing of other devices such as for example mobile phones, and to other types of systems in which access is given conditionally to terminals, such as systems for accessing music or computer files.

Each feature disclosed in the description and (where appropriate) the claims and drawings may be provided independently or in any appropriate combination. Features described as being implemented in hardware may also be implemented in software, and vice versa.

Reference numerals appearing in the claims are by way of illustration only and shall have no limiting effect on the scope of the claims. It should also be known that the term "master decoder" should be interpreted as a decoder that acts, at least temporarily, as a master decoder; conversely "slave decoder" should be interpreted as a decoder that acts, at least temporarily, as a slave decoder

What is claimed is:

1. A security module for use with a first device to be paired with a second device, the security module being adapted to be removably connected to the first device and comprising:
   a processor; and
   a memory, coupled to the processor, and adapted to store a device state that indicates whether the first device shall be a master or a slave device,
   wherein the processor can change the device state when the security module is in connection with the first device, the stored device state of the security module when delivered by a conditional access (CA) provider is a master state and wherein the processor then changes the device state of the security module from the master state to a slave state after a predetermined time in use unless the security module receives a dedicated Entitlement Management Message (EMM) telling the security module to remain in the master state before the end of the predetermined time.

2. The security module according to claim 1, wherein the device state is changed upon reception and processing of a transmitted dedicated Entitlement Management Message (EMM) transmitted from broadcaster to the first device.

* * * * *